(12) United States Patent
Hess et al.

(10) Patent No.: US 12,013,480 B2
(45) Date of Patent: Jun. 18, 2024

(54) VEHICULAR RADAR SENSOR WITH WAVEGUIDE CONNECTION EMBEDDED IN PCB

(71) Applicant: Magna Electronics Inc., Auburn Hills, MI (US)

(72) Inventors: Holger Hess, Aschaffenburg (DE); Wilhelm Johann Wolfgang Wöhlte, Sailauf (DE); Helmut A. Wodrich, Clarkston, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 153 days.

(21) Appl. No.: 17/303,629

(22) Filed: Jun. 3, 2021

(65) Prior Publication Data

US 2021/0382135 A1 Dec. 9, 2021

Related U.S. Application Data

(60) Provisional application No. 62/704,967, filed on Jun. 5, 2020.

(51) Int. Cl.
*G01S 7/03* (2006.01)
*G01S 7/02* (2006.01)
(Continued)

(52) U.S. Cl.
CPC .............. *G01S 7/03* (2013.01); *G01S 7/028* (2021.05); *H01Q 1/3233* (2013.01); *G01S 13/931* (2013.01)

(58) Field of Classification Search
CPC .......... G01S 7/03; G01S 7/028; G01S 13/931; G01S 2013/93275; H01Q 1/3233;
(Continued)

(56) References Cited

U.S. PATENT DOCUMENTS 6,587,186 B2 7/2003 Bamji et al.
6,674,895 B2 1/2004 Rafii et al.
(Continued)

OTHER PUBLICATIONS

"Basics of Waveguide Antennas.pdf" from https://blog.pasternack.com/waveguide-antennas/basics-of-waveguide-antennas/#:~:text=Basics%20of%20Waveguide%20Antennas%201%20%20Frequency%20Range,%20Antenna%20Pattern%208%20%20Polarization%20More%20items (Year: 2020).*

(Continued)

*Primary Examiner* — Olumide Ajibade Akonai
*Assistant Examiner* — Yonghong Li
(74) *Attorney, Agent, or Firm* — HONIGMAN LLP

(57) ABSTRACT

A vehicular radar sensing system includes a radar sensor disposed at a vehicle. The radar sensor includes a waveguide antenna and a printed circuit board (PCB) with an inboard side and an outboard side. A processor is disposed at the inboard side of the PCB and the waveguide antenna is disposed at the outboard side of the PCB. The waveguide antenna is partially disposed within a cavity at the outboard side of the PCB. Radio frequency signals are electrically communicated between the processor and the waveguide antenna through only a portion of the PCB. The waveguide antenna (i) guides the transmitted radio signals from the transmitter to the exterior environment and (ii) guides reflected radio signals from the exterior environment to the receiver.

20 Claims, 3 Drawing Sheets

(51) Int. Cl.
*H01Q 1/32* (2006.01)
*G01S 13/931* (2020.01)

(58) Field of Classification Search
CPC ............... H01Q 1/2283; H05K 9/0033; H05K 2201/0707; H05K 2201/10545; H05K 2201/0999; H01R 24/50; H01R 13/6594
See application file for complete search history.

(56) References Cited

U.S. PATENT DOCUMENTS

| | | | |
|---|---|---|---|
| 6,678,039 B2 | 1/2004 | Charbon | |
| 6,690,354 B2 | 2/2004 | Sze | |
| 6,710,770 B2 | 3/2004 | Tomasi et al. | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,053,357 B2 | 5/2006 | Schwarte | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,146,898 B2 | 9/2015 | Ihlenburg et al. | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,753,121 B1 | 9/2017 | Davis et al. | |
| 11,454,719 B2 | 9/2022 | Hess et al. | |
| 2010/0245066 A1 | 9/2010 | Sarioglu et al. | |
| 2012/0050125 A1* | 3/2012 | Leiba | H01Q 1/2283 343/834 |
| 2015/0346322 A1* | 12/2015 | Schmalenberg | H01Q 13/206 342/175 |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0231635 A1 | 8/2018 | Woehlte | |
| 2019/0124238 A1 | 4/2019 | Byrne et al. | |
| 2019/0124243 A1 | 4/2019 | Mleczko et al. | |
| 2019/0306966 A1 | 10/2019 | Byrne et al. | |
| 2019/0348746 A1* | 11/2019 | Gupta | H01L 23/49838 |
| 2020/0001787 A1 | 1/2020 | Lu et al. | |
| 2020/0033549 A1 | 1/2020 | Liu et al. | |
| 2020/0137926 A1 | 4/2020 | Wohlte | |
| 2020/0166637 A1 | 5/2020 | Hess et al. | |

OTHER PUBLICATIONS

"FR-4 Versus High Frequency Laminates _ Microwave Journal.pdf" from https://www.microwavejournal.com/blogs/1-rog-blog/post/16662-fr-4-versus-high-frequency-laminates#:~:text=FR-4%20typically%20has%20a,circuit%20built%20on%20FR-4. (Year: 2010).*

* cited by examiner

VEHICULAR RADAR SENSOR WITH WAVEGUIDE CONNECTION EMBEDDED IN PCB

CROSS REFERENCE TO RELATED APPLICATION

The present application claims the filing benefits of U.S. provisional application Ser. No. 62/704,967, filed Jun. 5, 2020, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

It is known to provide a radar sensor or a plurality of radar sensors at a vehicle. Examples of vehicular radar sensing systems are described in U.S. Pat. Nos. 8,027,029; 8,013,780 and/or 7,053,357, which are hereby incorporated herein by reference in their entireties.

SUMMARY OF THE INVENTION

Implementations herein provide a driving assistance system or sensing system or vehicle control system for a vehicle that utilizes one or more radar sensors to sense regions exterior or interior of the vehicle, with a radar sensor that transmits and receives signals, and with the received signals processed to detect the presence of objects at or near or within the vehicle in the field of sensing of the sensor.

The radar sensor includes (i) at least one transmitter that transmits radio signals and (ii) at least one receiver that receive radio signals, and wherein received radio signals received by the at least one receiver are transmitted radio signals that are reflected from an object present in a field of sensing of the radar sensor. The at least one transmitter includes at least one transmitting element and the at least one receiver comprises at least one receiving element. The radar sensor includes a waveguide antenna. The radar sensor also includes a processor operable to process radio signals transmitted by the at least one transmitter and received by the at least one receiver and a printed circuit board (PCB) that includes an inboard side and an outboard side separated by a thickness of the PCB. The processor is disposed at the inboard side of the PCB and the waveguide antenna is disposed at the outboard side of the PCB. The PCB includes at least one cavity at the outboard side of the PCB and the at least one transmitting element is disposed within the at least one cavity and the at least one receiving element is disposed within the at least one cavity. The waveguide antenna is in communication with the at least one transmitting element via a transmitter waveguide port that is disposed at least partially within the at least one cavity and the waveguide antenna is in communication with the at least one receiving element via a receiver waveguide port that is disposed at least partially within the at least one cavity. Radio frequency (RF) signals are electrically communicated between the processor and the waveguide antenna through only a portion of the PCB. The waveguide antenna (i) guides the transmitted radio signals from the transmitter waveguide port at the at least one transmitting element to an environment and (ii) guides reflected radio signals from the environment to the receiver waveguide port at the at least one receiving element.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
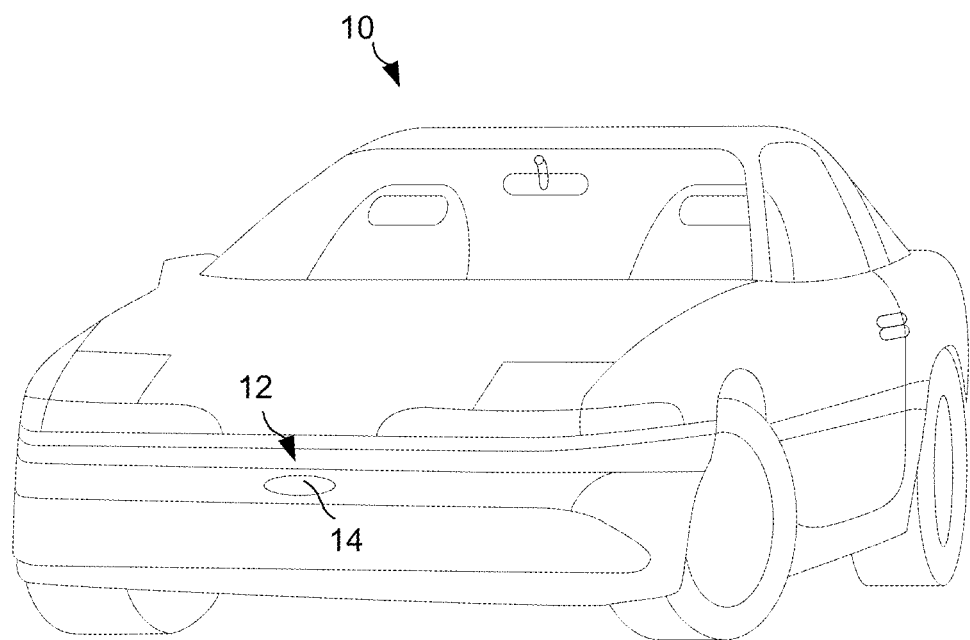
FIG. 1 is a perspective view of a vehicle with a sensing system that incorporates a radar sensor.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 may include an interior radar sensor unit that senses an interior of the vehicle such as one used to detect an occupant in the vehicle and/or to monitor the driver or occupants as part of a driver monitoring system or occupant monitoring system. The sensing system 12 includes a control or electronic control unit (ECU) that includes electronic circuitry and associated software, with the electronic circuitry including a data processor that is operable to process data captured by the radar sensor(s). The radar sensor includes a plurality of transmitters that transmit radio signals via plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controls at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Figure 2:
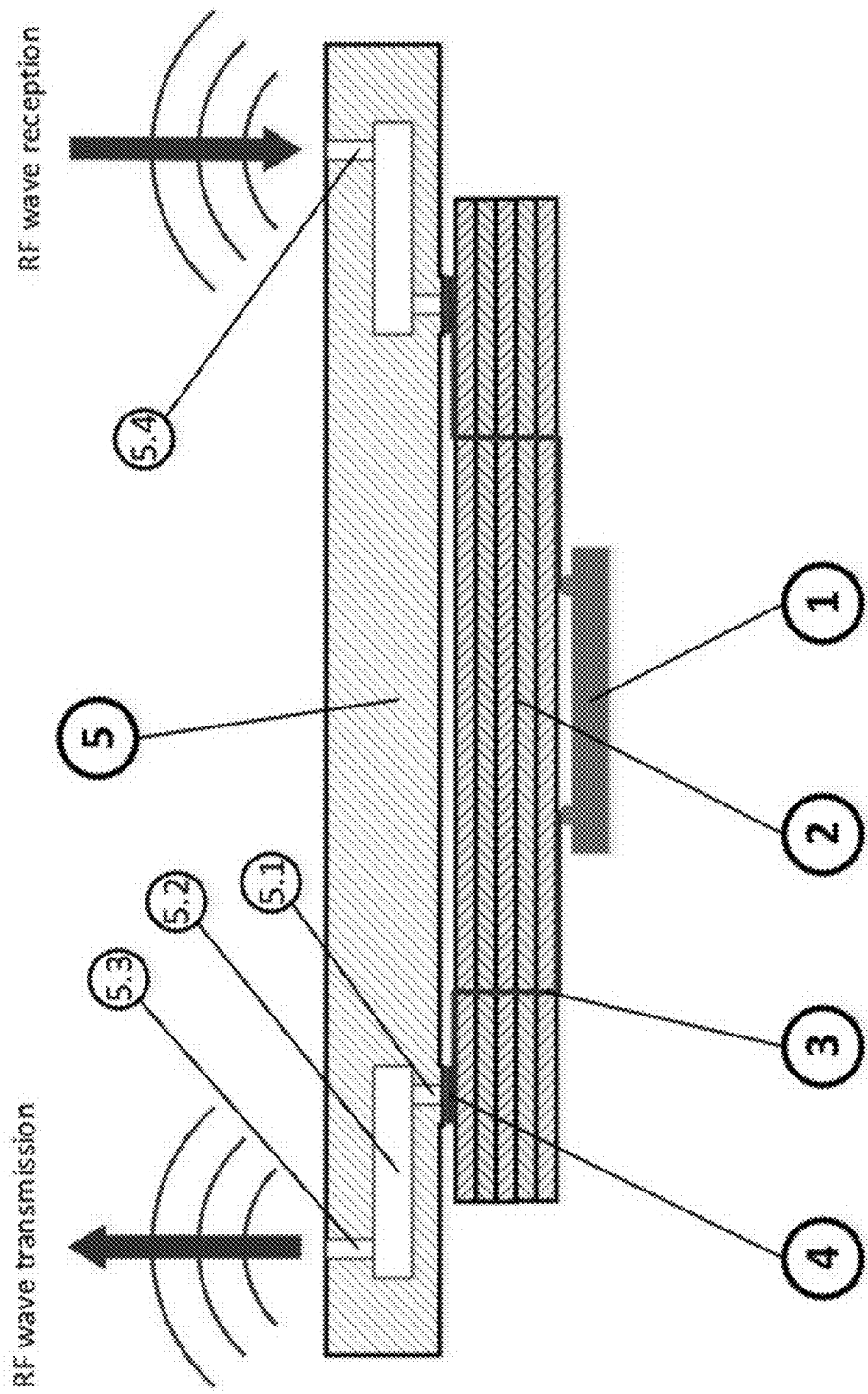
FIG. 2 is a cross-section of a radar sensor with waveguide antennas assembled outside of a printed circuit board.

Air waveguide antennas are commonly used in radar applications. As shown in FIG. 2, a radar sensor may include a multi-layer printed circuit board (PCB) 2 that has a radio frequency (RF) chip 1 soldered to a side (e.g., the bottom or inboard side) of the PCB. A waveguide antenna 5 is assembled external of the PCB 2 (e.g., the top or outboard side of the PCB). The waveguide antenna 5 may include a waveguide port 5.1, a waveguide structure 5.2, a transmitting radiating element 5.3 (i.e., an element that radiates out signals received from the RF chip 1), and a receiving radiating element 5.3 (i.e., an element that receives RF signals from the ambient environment and directs them towards the RF chip 1).

Because the RF chip 1 is soldered to the opposite side of the PCB 2 from where the waveguide antennas are assembled (i.e., the PCB is soldered to the inboard side of the PCB and the waveguide antenna is assembled to the outboard side of the PCB), the RF signals passing between the antenna 5 and the RF chip 1 must travel through the PCB 2 (e.g., using trace 3). A radiating element 4 is disposed on the opposite side of the PCB 2 from the RF chip 1 and directs RF signals between the outboard side of the PCB and the waveguide antenna 5. Thus, the RF signals must travel through the PCB, and the RF signals may become very lossy (i.e., incur signal loss). Additionally or alternatively, the PCB 2 may require special design characteristics to ensure that each layer is optimized for RF to attempt to minimize interference, thus increasing PCB cost and design time.

Figure 3:
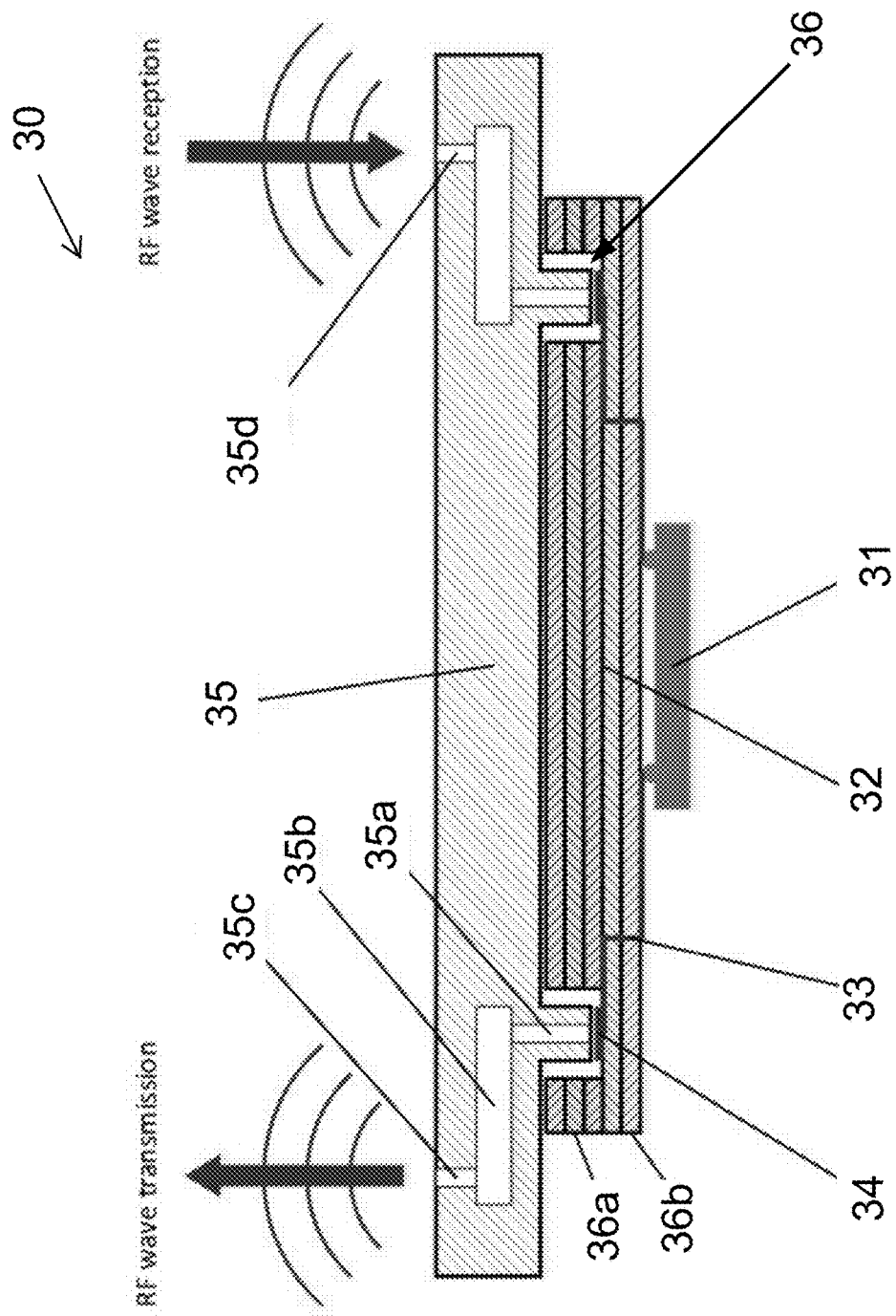
FIG. 3 is a cross-section of a radar sensor with waveguide antennas disposed a portion within a printed circuit board.

Referring now to FIG. 3, the sensing system 12 includes a waveguide antenna system or radar sensor 30 that reduces or eliminates signal loss resulting from the RF signals traversing the PCB. The radiating elements are integrated into internal layers of the PCB with openings in the PCB above the radiating elements to expose the radiating elements to the environment thus forming one or more cavities in the surface of the PCB. The waveguide structure may then be disposed partially within the PCB by disposing a portion of the waveguide structure within the openings (i.e., sinking the waveguide structure into the cavities) above the radiating elements. The waveguide antenna may utilize aspects of the waveguide antennas described in U.S. Patent Pub. No. US-2020-0166637, published May 28, 2020, which is hereby incorporated by reference in its entirety. Thus, the RF signals need only to cross a subset of the PCB layers (i.e., only the layers from the bottom of the cavity to the inboard side of the PCB), thus reducing signal loss. Additionally, only the layers that RF signals cross may require RF optimization (e.g., the layers that the trace(s) that carry the RF signals from the RF chip to the bottom of the cavity of the inboard side of the PCB), thus reducing PCB cost by allowing cheaper material use.

As illustrated in FIG. 3, an RF chip 31 is soldered to a bottom or inboard side of a PCB 32. The PCB includes at least one cavity or hole or depression 36 with an exposed radiating element 34 disposed at the bottom of the cavity. Wiring 33 (e.g., traces) electrically conduct RF signals from the radiating elements 34 to the RF chip 31 (and vice versa). A three-dimensional (3D) waveguide antenna 35 is disposed on the top or outboard side of the PCB 32 (i.e., the side facing the environment). Portions of the waveguide antenna 35 reside within the cavities 36. That is, waveguide ports 35*a* are at least partially received in or "sunk" into the PCB at the cavities 36.

The radar sensor 30 includes one or more transmitters. Optionally, each transmitter includes a transmitting portion disposed at the RF chip 31, a transmitting element 34, and traces or wiring 33 electrically connecting the transmitting portion and the transmitting element 34. That is, the transmitting element 34 receives signals from the transmitting portion of the RF chip 31 (e.g., via the traces or wiring 33) and radiates the signals to a waveguide port 35*a*.

The radar sensor 30 also includes one or more receivers. Optionally, each receiver includes a receiving portion disposed at the RF chip 31, a receiving element 34, and traces or wiring 33 electrically connecting the receiving portion and the receiving element 34. The receiving element 34 may receive signals from the waveguide port 35*a* and send the signals, via the receiving element 34 and the traces 33, to one or more receiving portions at the RF chip 31.

The waveguide structure 35*b* includes a waveguide transmitting radiating element 35*c* for transmitting RF signals (e.g., signals received from the transmitting element 34) to the environment and a waveguide receiving radiating element 35*d* for receiving RF signals from the environment (with the waveguide receiving radiating element 35*d* in communication with a receiver of the RF chip 31 via, for example, the receiving element 34 disposed at the respective cavity 36, the wiring 33, and the receiving portion at the RF chip 31).

The PCB 32 includes a plurality of layers. A portion of the layers 36*a* may include standard or non-RF optimized materials while a different portion of the layers 36*b* may include materials optimized for RF signals. For example, the layers that the traces 33 do not pass through or over may include the standard or non-RF optimized materials while the layers that the traces 33 do pass through or over may include the materials optimized for RF. The RF signals may pass from the radiating elements 34 disposed at the bottom of the cavities 36 through only the RF optimized layers 36*b* and not through the layers 36*a*.

That is, the traces 33 may not pass through or over the layers of the PCB 32 disposed outboard of the layers at the bottom of the cavities 36.

Optionally, the RF chip 31 may include a heatsink. The heat sink may utilize aspects of the systems and assemblies described in U.S. Publication Nos. US-2020-0137926; US-2020-0033549; US-2020-0001787; US-2019-0306966; US-2019-0124243 and/or US-2019-0124238, which are all hereby incorporated herein by reference in their entireties.

The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are all hereby incorporated herein by reference in their entireties.

The radar sensors of the sensing system may each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:
    a radar sensor disposed at a vehicle;
    wherein the radar sensor comprises (i) at least one transmitter that transmits radio signals and (ii) at least one receiver that receive radio signals, and wherein received radio signals received by the at least one receiver are transmitted radio signals that are reflected from an object present in a field of sensing of the radar sensor;
    wherein the at least one transmitter comprises at least one transmitting element and the at least one receiver comprises at least one receiving element;
    wherein the radar sensor comprises a waveguide antenna structure, and wherein the waveguide antenna structure comprises a (i) first transmitting waveguide port, (ii) a transmitting waveguide, and (iii) a second transmitting waveguide port;
    wherein the waveguide antenna structure comprises (i) a first receiving waveguide port, (ii) a receiving waveguide, and (iii) a second receiving waveguide port;
    wherein the radar sensor comprises a processor operable to process radio signals transmitted by the at least one transmitter and received by the at least one receiver;
    wherein the radar sensor comprises a printed circuit board (PCB) independent from the antenna waveguide structure, wherein the PCB comprises an inboard side and an outboard side separated by a thickness of the PCB;
    wherein the processor is disposed at the inboard side of the PCB, and wherein the waveguide antenna structure is disposed at the outboard side of the PCB;
    wherein the PCB comprises at least one cavity at the outboard side of the PCB, wherein the at least one transmitting element is disposed within the at least one cavity, and wherein the at least one receiving element is disposed within the at least one cavity;
    wherein the first transmitting waveguide port is disposed within the at least one cavity, and wherein the second transmitting waveguide port extends beyond an outer periphery of the PCB;
    wherein the first transmitting waveguide port guides the transmitted radio signals from the at least one transmitting element to the transmitting waveguide, and wherein the transmitting waveguide guides the transmitted radio signals from the first transmitting waveguide port to the second transmitting waveguide port, and wherein the second transmitting waveguide port guides the transmitted radio signals from the transmitting waveguide to an environment exterior of the vehicle;
    wherein the second receiving waveguide port is disposed within the at least one cavity, and wherein the first receiving waveguide port extends beyond the outer periphery of the PCB;
    wherein the first receiving waveguide port guides the received radio signals from the environment exterior of the vehicle to the receiving waveguide, and wherein the receiving waveguide guides the received radio signals from the first receiving waveguide port to the second receiving waveguide port, and wherein the second receiving waveguide port guides the received radio signals from the receiving waveguide to the at least one receiving element; and
    wherein the transmitted radio signals and the received radio signals are electrically communicated between the processor and the waveguide antenna structure through only a portion of the PCB.

2. The vehicular radar sensing system of claim 1, wherein the PCB comprises two cavities.

3. The vehicular radar sensing system of claim 2, wherein the first transmitting waveguide port and the at least one transmitter are disposed within a first cavity of the two cavities, and wherein the second receiver waveguide port and the at least one receiver are disposed within a second cavity of the two cavities.

4. The vehicular radar sensing system of claim 1, wherein the PCB comprises a plurality of layers.

5. The vehicular radar sensing system of claim 4, wherein the at least one cavity passes through two or more of the plurality of layers.

6. The vehicular radar sensing system of claim 4, wherein the portion of the PCB that the transmitted radio signals and the received radio signals are electrically communicated through comprises at least one layer of an RF optimized material.

7. The vehicular radar sensing system of claim 6, wherein the transmitted radio signals and the received radio signals are electrically communicated via traces that pass through or over the at least one layer of the RF optimized material.

8. The vehicular radar sensing system of claim 6, wherein a portion of the PCB that the transmitted radio signals and the received radio signals are not electrically communicated through comprises at least one layer of non-RF optimized material.

9. The vehicular radar sensing system of claim 8, wherein the second receiver waveguide port and the first transmitting waveguide port pass through the at least one layer of non-RF optimized material.

10. The vehicular radar sensing system of claim 1, wherein the transmitting waveguide extends beyond the outer periphery of the PCB.

11. The vehicular radar sensing system of claim 1, wherein the receiving waveguide extends beyond the outer periphery of the PCB.

12. A vehicular radar sensing system, the vehicular radar sensing system comprising:
    a radar sensor disposed at a vehicle;
    wherein the radar sensor comprises (i) at least one transmitter that transmits radio signals and (ii) at least one receiver that receive radio signals, and wherein received radio signals received by the at least one receiver are transmitted radio signals that are reflected from an object present in a field of sensing of the radar sensor;
    wherein the at least one transmitter comprises at least one transmitting element and the at least one receiver comprises at least one receiving element;

wherein the radar sensor comprises a waveguide antenna structure, and wherein the waveguide antenna structure comprises a (i) a first transmitting waveguide port, (ii) a transmitting waveguide, and (iii) a second transmitting waveguide port;

wherein the waveguide antenna structure comprises (i) a first receiving waveguide port, (ii) a receiving waveguide, and (iii) a second receiving waveguide port;

wherein the radar sensor comprises a processor operable to process radio signals transmitted by the at least one transmitter and received by the at least one receiver;

wherein the radar sensor comprises a printed circuit board (PCB) independent from the antenna waveguide structure, wherein the PCB comprises an inboard side and an outboard side separated by a thickness of the PCB;

wherein the PCB comprises a plurality of layers;

wherein the processor is disposed at the inboard side of the PCB, and wherein the waveguide antenna structure is disposed at the outboard side of the PCB;

wherein the PCB comprises at least one cavity at the outboard side of the PCB, wherein the at least one transmitting element is disposed within the at least one cavity, and wherein the at least one receiving element is disposed within the at least one cavity;

wherein the at least one cavity passes through at least one of the plurality of layers;

wherein the first transmitting waveguide port is disposed within the at least one cavity, and wherein the second transmitting waveguide port extends beyond an outer periphery of the PCB;

wherein the first transmitting waveguide port guides the transmitted radio signals from the at least one transmitting element to the transmitting waveguide, and wherein the transmitting waveguide guides the transmitted radio signals from the first transmitting waveguide port to the second transmitting waveguide port, and wherein the second transmitting waveguide port guides the transmitted radio signals from the transmitting waveguide to an environment exterior of the vehicle;

wherein the second receiving waveguide port is disposed within the at least one cavity, and wherein the first receiving waveguide port extends beyond the outer periphery of the PCB;

wherein the first receiving waveguide port guides the received radio signals from the environment exterior of the vehicle to the receiving waveguide, and wherein the receiving waveguide guides the received radio signals from the first receiving waveguide port to the second receiving waveguide port, and wherein the second receiving waveguide port guides the received radio signals from the receiving waveguide to the at least one receiving element; and wherein the transmitted radio signals and the received radio signals are electrically communicated between the processor and the waveguide antenna structure through only a portion of the PCB.

13. The vehicular radar sensing system of claim 12, wherein the PCB comprises two cavities.

14. The vehicular radar sensing system of claim 13, wherein the first transmitting waveguide port and the at least one transmitter are disposed within a first cavity of the two cavities, and wherein the second receiver waveguide port and the at least one receiver are disposed within a second cavity of the two cavities.

15. The vehicular radar sensing system of claim 12, wherein the portion of the PCB that the transmitted radio signals and the received radio signals are electrically communicated through comprises at least one layer of an RF optimized material.

16. The vehicular radar sensing system of claim 15, wherein the transmitted radio signals and the received radio signals are electrically communicated via traces that pass through or over the at least one layer of the RF optimized material.

17. A vehicular radar sensing system, the vehicular radar sensing system comprising:

a radar sensor disposed at a vehicle;

wherein the radar sensor comprises (i) at least one transmitter that transmits radio signals and (ii) at least one receiver that receive radio signals, and wherein received radio signals received by the at least one receiver are transmitted radio signals that are reflected from an object present in a field of sensing of the radar sensor;

wherein the at least one transmitter comprises at least one transmitting element and the at least one receiver comprises at least one receiving element;

wherein the radar sensor comprises a waveguide antenna structure, and wherein the waveguide antenna structure comprises a (i) a first transmitting waveguide port, (ii) a transmitting waveguide, and (iii) a second transmitting waveguide port;

wherein the waveguide antenna structure comprises (i) a first receiving waveguide port, (ii) a receiving waveguide, and (iii) a second receiving waveguide port;

wherein the radar sensor comprises a processor operable to process radio signals transmitted by the at least one transmitter and received by the at least one receiver;

wherein the radar sensor comprises a printed circuit board (PCB) independent from the antenna waveguide structure, wherein the PCB comprises an inboard side and an outboard side separated by a thickness of the PCB;

wherein the processor is disposed at the inboard side of the PCB, and wherein the waveguide antenna structure is disposed at the outboard side of the PCB;

wherein the at least one transmitter comprises at least one transmitting trace connecting the processor to the at least one transmitting element;

wherein the at least one receiver comprises at least one receiving trace connecting the processor to the at least one receiving element;

wherein the PCB comprises at least one cavity at the outboard side of the PCB, wherein the at least one transmitting element is disposed within the at least one cavity, and wherein the at least one receiving element is disposed within the at least one cavity;

wherein the first transmitting waveguide port is disposed within the at least one cavity, and wherein the second transmitting waveguide port extends beyond an outer periphery of the PCB;

wherein the first transmitting waveguide port guides the transmitted radio signals from the at least one transmitting element to the transmitting waveguide, and wherein the transmitting waveguide guides the transmitted radio signals from the first transmitting waveguide port to the second transmitting waveguide port, and wherein the second transmitting waveguide port guides the transmitted radio signals from the transmitting waveguide to an environment exterior of the vehicle;

wherein the second receiving waveguide port is disposed within the at least one cavity, and wherein the first receiving waveguide port extends beyond the outer periphery of the PCB;

wherein the first receiving waveguide port guides the received radio signals from the environment exterior of the vehicle to the receiving waveguide, and wherein the receiving waveguide guides the received radio signals from the first receiving waveguide port to the second receiving waveguide port, and wherein the second receiving waveguide port guides the received radio signals from the receiving waveguide to the at least one receiving element; and wherein the transmitted radio signals and the received radio signals are electrically communicated between the processor and the waveguide antenna structure via the at least one transmitting trace and the at least one receiving trace.

18. The vehicular radar sensing system of claim 17, wherein the PCB comprises a plurality of layers, and wherein at least one layer of the plurality of layers comprises an RF optimized material, and wherein at least one different layer of the plurality of layers comprises a non-RF optimized material.

19. The vehicular radar sensing system of claim 18, wherein the at least one transmitting trace and the at least one receiving trace pass through or over the at least one layer comprising the RF optimized material, and wherein the at least one transmitting trace and the at least one receiving trace do not pass through the at least one different layer comprising the non-RF optimized material.

20. The vehicular radar sensing system of claim 17, wherein the transmitting waveguide extends beyond the outer periphery of the PCB.

* * * * *